Patented Feb. 10, 1942

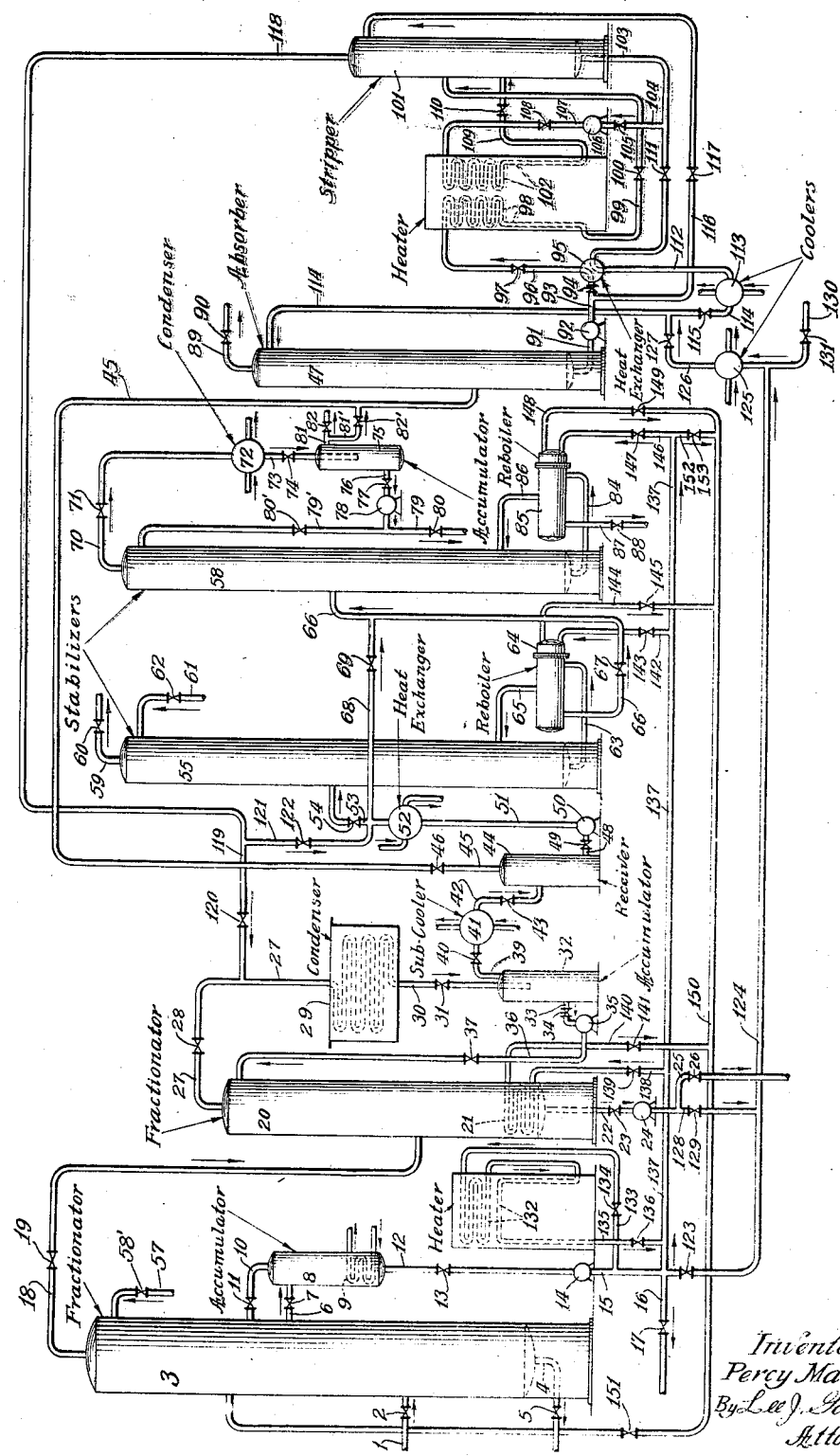

2,272,306

UNITED STATES PATENT OFFICE 2,272,306

TREATMENT OF HYDROCARBONS

Percy Mather, Chicago, Ill., assignor to Universal Oil Products Company, Chicago, Ill., a corporation of Delaware Application September 16, 1938, Serial No. 230,170

7 Claims. (Cl. 196—8)

The invention relates to an improved process for the separation of vaporous products resulting from the cracking of hydrocarbon oil into a plurality of selected fractions such as, for example, reflux condensate for further cracking, substantially gas-free heavy gasoline fractions, light gasoline fractions containing regulated quantities of dissolved heavy gases, a relatively normally gaseous product rich in readily polymerizable olefins such as propene and/or butenes and a lighter gaseous product substantially free of butanes and butenes.

The advent and rapid adoption of a highly successful process for the catalytic polymerization of normally gaseous olefins, such as propene and/or butenes, formed by the cracking of hydrocarbon oils, to produce from said olefins substantial yields of liquid products boiling within the range of gasoline and exceptionally high antiknock value, has made the efficient and substantial recovery of such gases a matter of major importance in the oil refining industry. Depending upon the results desired and the operating conditions employed in the polymerization process, it may be desirable to recover substantially only butane-butene fractions as the polymerization stock or the latter may include substantial quantities of propene. In any case, the inclusion of substantial quantities of paraffinic gases corresponding to the olefinic gases to be polymerized is desirable, these paraffinic gases acting as a diluent in the polymerization stock to assist in preventing excessive polymerization of the olefins to products heavier than gasoline.

The present invention offers an efficient method and means of separating polymerization stocks of either of the types above mentioned from lighter and heavier products of the cracking operation and such polymerization stock may, in accordance with the features of the invention, be readily recovered as a liquid without the use of a compressor. This simplifies handling of the polymerization stock, since it may be easily pumped to the polymerizing system at the preferred superatmospheric pressure. In addition to accomplishing the desired results above mentioned, separation of the desired gasoline product of the cracking operation into selected relatively low-boiling and higher boiling fractions is accomplished in the present process. This is a highly desirable feature since separate refining treatment of the light and heavy gasoline fractions is often advantageous.

In the preferred embodiment of the invention, the vapor pressure of the final total gasoline product of the cracking operation is controlled by substantially stripping the heavy gasoline fractions of dissolved gases and stabilizing the light gasoline fractions to a vapor pressure materially higher than that desired for the finished gasoline, the vapor pressure of said light gasoline fractions preferably being such that, by blending the same with the substantially gas-free heavy gasoline fractions produced, the resulting blend will have a Reid vapor pressure of 8 to 10 pounds, per square inch, for example, or any other predetermined desired vapor pressure.

This separation of the total gasoline into selected low-boiling and high-boiling fractions with substantial stripping of the latter serves to concentrate in the former substantially all of the gases dissolved in the total gasoline produced and provides, in the form of the substantially stripped heavy gasoline fractions, an excellent absorbent for the desired heavy gases which remain uncondensed and undissolved in the whole gasoline resulting from condensation of the fractionated vaporous products of the cracking operation.

The gas-containing light gasoline fractions resulting from said separation of the whole gasoline are, in accordance with the provisions of the invention, preferably first freed of at least a major portion of its undesired light gaseous components in a primary stabilization step, while retaining therein substantially all of the desired heavier gases. The resulting primary stabilized product is then further stabilized to the desired vapor pressure by liberating regulated quantities of the remaining dissolved gases and the gases liberated in the second mentioned stabilization step are substantially condensed to form the desired liquid polymerization stock.

A regulated portion of the heavy gasoline fractions are removed from the system for suitable refining treatment, when the latter is required, and may be subsequently blended with the light gasoline fractions resulting from the second mentioned stabilization step, after the latter have been separately treated, when required, to form the final whole gasoline product of the desired vapor pressure.

Another regulated portion of the heavy gasoline fractions is intimately contacted in an absorption step with the aforementioned uncondensed and undissolved gases, whereby desirable high-boiling components are recovered therefrom by absorption. The resulting enriched absorber oil is substantially stripped of dissolved gases and the gases thus liberated are supplied to the first mentioned stabilization step wherein they are substantially separated into undesired light fractions, which are removed from this step, and desired heavy fractions which are included in the distillate supplied from the primary to the secondary stabilization step.

It will be apparent from the foregoing that all of the desirable objectives above mentioned are accomplished concomitantly in a unified system employing a plurality of interdependent and cooperative steps. Invention resides in this cooperative combination of steps. However, the process includes several novel features and cooperative combinations which are believed to involve invention but constitute less than the entire combination disclosed. It is therefore not desired to limit the invention claimed to this entire combination.

The invention provides several alternative but non-equivalent features and modes of operation which will be explained in conjunction with the description of the accompanying diagrammatic drawing.

The drawing illustrates diagrammatically one specific form of apparatus embodying the features of the invention and in which the improved process herein taught may be successfully conducted.

Referring to the drawing, a mixture of vaporous and gaseous products resulting from the cracking of hydrocarbon oil is supplied in heated state through line 1 and valve 2 to fractionator 3 wherein one or a plurality of reflux condensates, preferably comprising substantially all of the vapors boiling above the range of the desired gasoline product, are formed by fractional condensation. The total reflux condensate thus formed, or, when desired, only selective heavy fractions of the reflux condensate are removed from the lower portion of the fractionator through line 4 and may be directed through valve 5 in this line to further cracking treatment within the same or a separate system from which said vaporous and gaseous mixture is derived or to cooling and storage or elsewhere, as desired.

When only high-boiling fractions of the reflux condensate are removed, as described, from the lower portion of the fractionator, one or a plurality of selected low-boiling fractions may be removed from one or more suitable intermediate points in column 3. In the case here illustrated, provision is made for directing relatively low-boiling reflux condensate (such as, for example, light gas oil) from column 3 through line 6 and valve 7 to accumulator 8. It is preferably supplied with sufficient heat in accumulator 8 to substantially free the same of dissolved gases and other undesired low-boiling components such as materials boiling within the range of the overhead vaporous product removed from the fractionator. This is accomplished, in the case here illustrated, by passing a suitable heating medium through coil 9 in the lower portion of column 8. These liberated light vapors and gases are returned from the upper portion of accumulator 8 through line 10 and valve 11 to fractionator 3, while the reboiled light reflux condensate is directed from the lower portion of accumulator 8 through line 12 and valve 13 to pump 14 wherefrom it is fed through line 15 and may be directed, all or in part, through line 16 and valve 17 to further cracking within the same or a separate cracking system or to cooling and storage or elsewhere, as desired. Preferably, however, regulated quantities of this light reflux condensate, before being further cracked or discharged from the system, are utilized for one or a plurality of purposes from within the system, as will be later described.

Fractionated vapors of the desired end-boiling point, which preferably consist essentially of materials boiling within the range of the desired gasoline product and normally gaseous products of the cracking operation, are directed from the upper portion of fractionator 3 through line 18 and valve 19 to fractionator 20 wherein they are separated by fractional condensation into selected relatively low-boiling and higher boiling components.

In the case here illustrated, the lower portion of fractionator 20 comprises a reboiler section wherein the relatively heavy fractions formed as reflux condensate in this zone are substantially freed of dissolved gases and other undesired low-boiling fractions by indirect heat exchange with a suitable heating medium passed through closed coil 21 in this zone. Such reboiling may, however, be accomplished, when desired, in a zone external to column 20 such, for example, as will be described, in conjunction with the subsequent description of the stabilizing steps of the system.

The reboiled relatively high-boiling gasoline fractions are removed, in the case here illustrated, from the lower portion of fractionator 20 and directed through line 22 and valve 23 to pump 24 wherefrom all or a regulated portion of this product may be discharge from the system through line 25 and valve 26 to cooling and storage or elsewhere, as desired. Preferably, however, regulated quantities of this material are first utilized within the system in the manner subsequently described.

The selected low-boiling fractions of the vaporous products supplied, as described, to fractionator 20 are directed in vaporous state from the upper portion of this zone through line 27 and valve 28 to condenser 29, wherein they are subjected to cooling and partial condensation. The resulting distillate and uncondensed vapors and gases pass through line 30 and valve 31 to accumulator 32 wherefrom regulated quantities of the distillate are recirculated by means of line 33, valve 34, pump 35, line 36 and valve 37 to the upper portion of fractionator 20 to serve as a cooling and refluxing medium in this zone for controlling the temperature and end-boiling point of the overhead vaporous stream removed therefrom.

Although not illustrated, when desired, means similar to that described in the preceding paragraph may be utilized for accomplishing cooling and assisting fractionation in the upper portion of fractionator 3, this being accomplished by diverting a portion of the vaporous stream from line 18 through a suitable condenser to an accumulator wherefrom regulated quantities of the resulting distillate are supplied by pump through line 57 and valve 58' to the upper portion of fractionator 3. Any other well known means of accomplishing cooling and fractionation in the upper portion of fractionator 3 may be employed within the scope of the invention and the invention specifically contemplates the introduction of gasoline, produced in a separate cracking system, into the upper portion of fractionator 3 through line 57 and valve 58' for this purpose. In such cases, the suceeding portions of the system may serve more than one cracking unit.

Any excess of distillate collected in accumulator 32, as well as vapors and gases which remain uncondensed by passage through condenser 29, are directed from accumulator 32 through line 39 and valve 40 to sub-cooler 41 wherein this material is sufficiently cooled to condense substantially all of its normally liquid components and to dissolve at least a substantial quantity of the heavy normally gaseous products of the process in the resulting distillate. The latter is directed from sub-cooler 41 through line 42 and valve 43 to receiver 44 wherein the gas-containing distillate is separated from the remaining uncondensed and undissolved gases. The latter are directed from receiver 44 through line 45 and valve 46 to absorber 47, the function of which will be later explained, while the gas-containing distillate from receiver 44 is directed through line 48 and valve 49 to pump 50 by means of which it is supplied through line 51, heat exchanger 52, line 53 and valve 54 to stabilizer 55 or, when desired, from heat exchanger 52 through line 68 and valve 69 to stabilizer 58.

The purpose of heat exchanger 52 is to supply to the unstabilized distillate at least a portion of the heat required to vaporize a substantial quantity of the gases dissolved therein and, when desired, a suitable relatively hot intermediate vaporous or liquid product of the process may be employed for this purpose by passing the same through heat exchanger 52 in indirect heat exchange with the distillate. However, any other suitable means of heating the unstabilized distillate to the desired temperature may be employed within the scope of the invention.

Preferably, however, when it is desired to recover a normally gaseous polymerization stock containing substantial quantities of propene as well as butene fractions, stabilizer 55 is eliminated from the system. Stabilizers 55 and 58 are preferably both employed when it is desired to eliminate substantially all or a major portion of the propane and propenes from the normally gaseous polymerization stock recovered. When both stabilizers are employed, the function of stabilizer 55 is to free the distillate supplied thereto of all or a substantial portion of the propane, propenes and lighter gases dissolved therein, while retaining in the stabilized distillate substantially all of the butane-butene fractions. The function of stabilizer 58, in either case, is to reduce the vapor pressure of the distillate supplied thereto to the desired degree by liberating regulated quantities of the gases dissolved therein. When operated in conjunction with stabilizer 55, the gases liberated in stabilizer 58 will consist predominantly of butane-butene fractions and a relatively small proportion of lighter gases. When stabilizer 55 is not utilized, the gases liberated in stabilizer 58 will include, in addition to butane-butene fractions, substantially all of the lighter gases dissolved in the distillate collected in receiver 44. In the latter case, the temperature and pressure conditions employed in sub-cooler 41 and receiver 44 are preferably so regulated that the gases supplied from receiver 44 to absorber 47 will contain a substantial quantity of propane and propenes, as well as some of the butanes and butenes, in order that the distillate collected in receiver 44 will be substantially free of gases boiling lower than propane, thereby substantially excluding such lower boiling gases from the polymerization stock.

The gases liberated in stabilizer 55 are discharged from the upper portion thereof through line 59 and valve 60 to storage or elsewhere, as desired. A suitable cooling and refluxing material is returned to the upper portion of the stabilizer through line 61 and valve 62 and may comprise, for example, a normally gaseous distillate condensed from the stream of gases removed from this zone, in which case suitable condensing, collecting and recirculating equipment, not illustrated, but such as shown and subsequently described in conjunction with stabilizer 58 is employed in conjunction with stabilizer 55. Any other well known means of accomplishing cooling and refluxing in column 55 may be employed, when desired.

The distillate and dissolved gases which remain unvaporized in column 55 are directed, in the case here illustrated, from the lower portion of this zone through line 63 to reboiler 64, wherein this material comes in indirect heat exchange with a suitable heating medium for reboiling the same. The volatile fractions evolved in reboiler 64 are returned through line 65 to column 55 and the reboiled distillate is directed through line 66 and valve 67 to stabilizing column 58.

When stabilizer 55 is not employed, valve 54 in line 53 and valve 67 in line 66 are closed and the reheated distillate from receiver 44, after passing through heat exchanger 52, is directed through line 68 and valve 69 to line 66 and thence to stabilizer 58.

The gases liberated in stabilizer 58 are directed from the upper portion of this zone through line 70 and valve 71 to condenser 72, wherein they are substantially cooled and condensed by indirect heat exchange with a suitable cooling medium and wherefrom the resulting products pass through line 73 and valve 74 to accumulator 75.

The normally gaseous condensate collected in accumulator 75 is the desired polymerization stock which, depending upon whether both stabilizers are employed or only stabilizer 55 is employed, may consist essentially of butane-butene fractions or may also include substantial quantities of propene and some propane, as previously explained. This condensate is directed from accumulator 75 through line 76 and valve 77 to pump 78 and, preferably, regulated quantities thereof are thence directed through line 79' and valve 80' to the upper portion of stabilizer 58 to serve as a cooling and refluxing medium in this zone, while the remaining portion is discharged from the system to the polymerization process or to storage or elsewhere, as desired, through line 79 and valve 80. Any light gases remaining uncondensed by cooling in condenser 72 and undissolved in the condensate collected in accumulator 75 may be removed from the accumulator through line 81 and valve 82 to storage or elsewhere, as desired, or they may be supplied by means of line 81' and valve 82' to absorber 47, the latter being preferable, particularly in case stabilizer 58 and accumulator 75 are operated at a somewhat higher pressure than that employed in absorber 47, whereby uncondensed gases may be supplied from accumulator 75 to absorber 47 without the use of a compressor.

The distillate and dissolved gases remaining unvaporized are directed from column 58, in the case here illustrated, through line 84 to reboiler 85 wherein this material is reboiled by indirect heat exchange with a suitable heating medium which is passed through this zone. The volatile materials evolved in reboiler 85 are returned therefrom to stabilizer 58 by means of line 86. The product withdrawn from reboiler 85 through line 87 and valve 88 consists of the light gasoline fractions removed with the overhead stream from fractionator 20 and stabilized to include substantially no dissolved gases or only a sufficient quantity thereof to impart the desired vapor pressure to the light gasoline fractions. This material may be directed to cooling and storage or to any desired further treatment and, when desired, may be eventually blended with the heavy gasoline fractions removed from the system through line 25 and valve 26, preferably after the latter have been subjected to separate further treatment, when this is required.

The gases supplied to absorber 47 will, due to the inefficient separation of light and heavy gases by the partial condensation effected in condenser 72 and/or sub-cooler 41, contain an appreciable quantity of desired heavy fractions such as propene and butenes. The function of absorber 47 is to recover at least a major portion of these desired heavy fractions from the gases supplied to this zone by absorption of the former in a suitable absorber oil, which is supplied to the upper portion of the absorber in the manner subsequently described. The absorber oil passes downwardly through the absorber counter-current to the ascending gases and the unabsorbed relatively light gases are removed from the upper portion of this zone through line 89 and valve 90 to storage or elsewhere, as desired. The resulting enriched absorber oil is directed from the lower portion of absorber 47 through line 91 to pump 92 and supplied therefrom through line 93, valve 94, heat exchanger 95, line 96 and valve 97 to and through heating coil 98 which, in the particular case here illustrated, is located within a suitable furnace setting and wherein sufficient heat is imparted to the enriched absorber oil to liberate substantial quantities of the absorbed gases therefrom. The heated absorber oil is directed from coil 98 through line 99 and valve 100 to stripping column 101, wherein substantially all of the gases are liberated from the absorber oil.

In the particular case here illustrated, instead of supplying all of the heat required for substantially complete stripping of the absorber oil to the latter within heating coil 98, another heating coil 102 is provided within the same furnace structure and bottoms from stripping column 101 are directed by means of line 103, line 104, valve 105, pump 106, line 107 and valve 108 to and through heating coil 102, wherein additional heat is imparted thereto, and thence through line 109 and valve 110 back to stripper 101, preferably entering this zone beneath the point at which the reheated absorber oil from coil 98 is supplied thereto, whereby the bottoms in stripper 101 are reboiled and substantially stripped of gases. The remainder of the substantially stripped absorber oil is directed from the lower portion of stripper 101 through valve 111 in line 103 to heat exchanger 95, wherethrough it passes in indirect heat exchange with the enriched absorber oil from absorber 47 and is partially cooled. It is thence directed through line 112 to further cooling in cooler 113 by indirect heat exchange with a suitable cooling medium and is supplied fro mcooler 113 through line 114 and valve 115 to the upper portion of absorber 47, wherein it is reused as absorber oil.

Provision is made, in the case here illustrated, for cooling in the upper portion of stripper 101 and assisting fractionation in this zone, to prevent the inclusion of liquid fractions of the absorber oil in the gaseous stream removed from the upper portion of the stripper, by supplying regulated quantities of the enriched absorber oil from column 47, prior to its passage through heat exchanger 95 to the upper portion of stripper 101 through line 116 and valve 117.

The gases absorbed in column 47 and released in stripper 101 are removed from the upper portion of this zone through line 118 and returned directly to the stabilization step or to any desired preceding point in the system, whereby further segregation of these gases into the desired heavy and undesired light fractions is accomplished in the stabilization step. Provision is made, in the case here illustrated, for returning gases from stripper 101 to condenser 29 through line 119, valve 120 and line 27 or to stabilizer 55 through line 121, valve 122, line 53 and valve 54 or to stabilizer 58 through line 121, valve 122, line 68, valve 69 and line 66. When stabilizer 55 is employed, valve 69 in line 68 is closed and gases from stripper 101 are not supplied directly to stabilizer 58. It is entirely within the scope of the invention to return the gases from stripper 101 to fractionator 3 or to fractionator 20 or accumulator 32 or sub-cooler 41, although well known means for accomplishing this are not shown in the drawing. Preferably, however, they are returned, as described, directly to stabilizer 55 when this zone is employed, or directly to stabilizer 58 when stabilizer 55 is not employed.

The oil employed as an absorbent in column 47 may be derived from an external source, when desired, but in the preferred method of operation this material is derived from within the system and comprises a substantially gas-free relatively light distillate such as selected low-boiling fractions of the reflux condensate formed in fractionator 3 or the heavy gasoline fractions removed from fractionator 20.

To permit the use of light reflux condensate from fractionator 3 as absorber oil, provision is made in the case here illustrated for directing reboiled light reflux condensate removed from accumulator 8, in the manner above described, through valve 123 in line 15 to and through line 124 to cooler 125 wherein it is cooled to the desired temperature by indirect heat exchange with a suitable cooling medium and wherefrom it is thence directed through line 126, valve 127 and line 114 to the upper portion of absorber 47.

To permit the use of heavy gasoline fractions from fractionator 20 as absorber oil, provision is made in the case here illustrated for directing the same from pump 24 through line 128 and valve 129 to and through line 124 and thence through cooler 125 wherein it is cooled to the desired temperature and through line 126, valve 127 and line 114 to the upper portion of absorber 47.

Provision is made for supplying absorber oil from storage or any desired external source to the system through line 130 and valve 131.

Since a cycle of absorber oil is set up between the absorption and stripping steps of the system, it is, of course, only necessary to supply absorber oil from accumulator 8, fractionator 20 or from an external source to the absorber at from beginning of the operation until a sufficient quantity thereof is accumulated for recirculation, and to periodically replenish any absorber oil lost by leakage or otherwise.

While the invention is not limited to the use of any particular heating medium for reboiling at the various points in the system, wherein reboiling is required, provision is made, in the case here illustrated, for utilizing light fractions of the reflux condensate formed in fractionator 3 for this purpose. To accomplish this a local cycle of this material is established within the system, regulated quantities of the light reflux condensate being heated at one point in the cycle to a temperature suitable for accomplishing the desired reboiling, the heated light reflux thence diverted in independently regulated quantities to the various reboiling zones in which it is utilized and thence returned to fractionator 3 and therefrom to the heating step of the cycle. Heating of the light reflux condensate to the temperature required is accomplished in heating coil 132 which is located in a suitable furnace setting and to which regulated quantities of the light reflux is supplied from pump 14 through line 15, line 133 and valve 134. Thus heated light reflux condensate is directed from coil 132 through line 135 and valve 136 into line 137. Heated oil is diverted in regulated quantities from line 137 through line 138 and valve 139 to coil 21 in the lower portion of fractionator 20, wherein the heavy gasoline fractions accumulated in this zone are reboiled, and supplied from coil 21 through line 140 and valve 141 to line 150. Another regulated quantity of the heated light reflux condensate is diverted from line 137 through line 142 and valve 143 to reboiler 64, wherein it reboils the distillate supplied to this zone and wherefrom it is directed through line 144 and valve 145 to line 150. Another regulated quantity of the reheated reflux condensate is directed from line 137 through line 146 and valve 147 to reboiler 85, wherein it heats the distillate in this zone to the desired temperature by indirect heat exchange therewith, and is thence directed through line 148 and valve 149 to line 150. Any remaining portion of the heated reboiling medium is supplied to line 15 from line 137 through line 152 and valve 153. From line 150 the light reflux condensate cooled in the various heat exchange steps is directed through valve 151 in this line to fractionator 3, thus completing the cycle of light reflux condensate. Instead of being directed to fractionator 3, it may, of course, be returned to any desired preceding point in the cracking system or to accumulator 8 or directly to heating coil 132 by well known means, not illustrated.

The operating conditions preferably employed in an apparatus such as illustrated and above described are approximately as follows:

The main fractionating column may employ a bottom temperature ranging, for example, from 720 to 770° F., a top temperature of from 370 to 410° F., and a superatmospheric pressure ranging from 80 to 150 pounds or more per square inch. A secondary fractionator may employ a top temperature ranging, for example, from 230 to 270° F. or more and a superatmospheric pressure substantially the same or slightly less than that maintained within the main fractionator. The primary stabilizer may utilize a top temperature of 110 to 145° F. and a superatmospheric pressure ranging, for example, from 250 to 350 pounds or more per square inch. The secondary stabilizer may employ a top temperature ranging, for example, from 150 to 200° F. with a superatmospheric pressure of from 100 to 200 pounds or more per square inch. The absorber may utilize a superatmospheric pressure ranging, for example, from 100 to 160 pounds or more per square inch with a bottom temperature of from 110 to 135° F. The stripping column may employ a top temperature ranging, for example, from 190 to 260° F. with a superatmospheric pressure ranging, for example, from 200 to 400 pounds or more per square inch and a bottom temperature ranging, for example, from 480 to 520° F. The heating coil to which the enriched absorber oil is supplied may employ an outlet temperature ranging, for example, from 400 to 430° F.

As an example of one specific operation of the process, as conducted in an apparatus such as illustrated and above described, fractionated vapors of the desired end-boiling point, corresponding to about 8,290 barrels of liquid per day, are withdrawn from the upper portion of fractionator 3 which is operated with a top temperature of about 380° F. and a superatmospheric pressure of about 100 pounds per square inch. The fractionated vapors are introduced to fractionator 20 wherein they are separated into light and heavy gasoline fractions. Fractionator 20 is preferably operated at substantially the same pressure as that maintained in fractionator 3 and a top temperature of approximately 250° F. is employed in this zone. Approximately 4,860 barrels per day of heavy gasoline are withdrawn from the lower portion of fractionator 20 and directed to cooling and storage. Fractionated vapors of the desired end-boiling point, totaling approximately 3,430 barrels per day, are withdrawn from the upper portion thereof, subjected to partial condensation to produce a refluxing liquid, which is returned to the upper portion of said fractionator, while the remaining uncondensed vapors and gases are subjected to further cooling and condensation and the resulting products introduced to a receiver for collection of the distillate and separation of the uncondensed and undissolved gases therefrom. The uncondensed and undissolved gases collected in this receiver are supplied from the upper portion thereof, to the absorber. Gasoline and dissolved gases collected in the receiver, amounting to approximately 2,430 barrels per day, is withdrawn from the lower portion thereof and introduced to stabilizer 55 which utilizes a top temperature of approximately 125° F. and a superatmospheric pressure of about 300 pounds per square inch. Simultaneous to the introduction of this material to stabilizer 55, stripped gases corresponding to approximately 575 barrels on a liquid basis, from stripper 101 are introduced to this stabilizer. Fractionated gases comprising principally propane, propene and the lighter gases, are withdrawn from the upper portion of stabilizer 55 and discharged from the system. The bottoms from stabilizer 55, comprising principally $C_4$ and heavier hydrocarbons, are withdrawn from the lower portion thereof and introduced to stabilizer 58 which is maintained at a superatmospheric pressure of about 150 pounds per square inch and which employs a top temperature of about 175° F. Fractionated gases consisting largely of butane and butenes and corresponding to about 700 barrels per day of liquid are withdrawn from the upper portion of stabilizer 58, subjected to condensation and cooling, and recovered as a product of the process. The bottoms in stabilizer 58, comprising substantially butane-free light gasoline fractions, are withdrawn from the lower portion thereof and directed to cooling and storage. Uncondensed gases collected in accumulator 75, to which the overhead stream from stabilizer 58 is directed, are supplied to absorber 47 in commingled state with the undissolved gases removed from the receiver to which the unstabilized light gasoline is supplied. In absorber 47, which is maintained at a pressure of approximately 100 pounds per square inch, the gases supplied thereto are contacted with an absorber oil which absorbs substantially all of the $C_4$ gases present and approximately 50% of the $C_3$ gases. The lighter gases which will remain unabsorbed in absorber 47 are withdrawn from the upper portion thereof and directed to storage or elsewhere as desired. The enriched absorber oil is withdrawn from the lower portion of absorber 47, heated to a temperature of approximately 415° F. in a heating coil 98 and then charged to stripper 101 which employs a superatmospheric pressure of about 300 pounds per square inch and a top temperature of approximately 225° F. The gases liberated in stripper 101 are supplied to stabilizer 55, as previously mentioned. Stripped absorber oil is withdrawn from the lower portion of stripper 101 and directed in part through heating coil 102 wherein it is raised to a temperature of approximately 550° F. and then returned to the stripper, coil 102 in this case acting as a reboiler for said stripper. The balance of the stripped absorber oil is returned after cooling to the upper portion of absorber 47 wherein it serves as an absorbing medium, as previously described. In this operation, based on the volume of the overhead stream from fractionator 3, approximately 58.7% of heavy gasoline, 17.3% of light gasoline, 8.4% of liquefied heavy gases rich in butane and butenes and about 15.6% lighter gases may be recovered.

I claim as my invention:

1. In a process of separating a mixture of vaporous and gaseous products resulting from the cracking of hydrocarbon oil into a plurality of selected fractions, wherein said mixture is fractionated to separate relatively heavy components therefrom as reflux condensate and form a stream of lower boiling fractionated vapors and gases, the improvement which comprises, further fractionating said stream to separate the same into a substantially gas-free condensate and a lighter stream of vapors and gases, recovering at least a regulated quantity of said condensate, substantially condensing the last named stream to form a distillate containing substantial quantities of dissolved heavy gases, separating the resulting gas-containing distillate from the remaining uncondensed and undissolved gases of the last named stream, stabilizing said gas-containing distillate to the desired vapor pressure by liberating therefrom regulated quantities of the dissolved gases, recovering high-boiling normally gaseous fractions thus liberated, separately recovering the stabilized distillate, separating desired heavy components from lighter components of said uncondensed and undissolved gases by contacting the latter with an absorber oil, substantially stripping the resulting enriched absorber oil of the absorbed high-boiling gases, returning resultant stripped absorber oil to the absorption step, and utilizing as said absorber oil regulated quantities of the reflux condensate formed in the first mentioned fractionating step after substantially freeing said reflux condensate of dissolved gases.

2. A process of separating a mixture of vaporous and gaseous products resulting from the cracking of hydrocarbon oil into a plurality of selected fractions which comprises, fractionating said mixture to condense reflux condensate therefrom and form a stream of lower boiling fractionated vapors and gases, further fractionating said lower boiling stream to separate the same into a substantially gas-free condensate and a lighter stream of vapors and gases, substantially condensing the latter to form a light distillate containing substantial quantities of dissolved gases, separating the resulting gas-containing distillate from remaining uncondensed and undissolved gases, supplying the gas-containing distillate to a primary stabilizer and therein liberating substantially all of the undesired low-boiling gases, while retaining in the partially stabilized distillate substantially all of the desired high-boiling gases, supplying said stabilized distillate to a secondary stabilizing step and therein reducing its vapor pressure to the desired degree by liberating therefrom regulated quantities of the dissolved heavy gases, recovering heavy normally gaseous fractions thus liberated in the secondary stabilizing step, separating the recovered stabilized distillate from the secondary stabilizing step, supplying said uncondensed and undissolved gases to an absorption step and therein separating desired high-boiling components from lighter components thereof by absorption of the former in an absorber oil, substantially stripping the resulting enriched absorber oil of absorbed gases, and returning gases liberated in the stripping step to the first mentioned stabilization step.

3. A process such as defined in claim 2, wherein said absorber oil comprises a regulated quantity of said substantially gas-free condensate formed in the second mentioned fractionating step.

4. A process such as defined in claim 2, wherein said absorber oil comprises a regulated quantity of the reflux condensate formed in the first mentioned fractionating step.

5. A process such as defined in claim 2, wherein selected low-boiling fractions of the reflux condensate formed in the first mentioned fractionating step are substantially freed of dissolved gases and a regulated quantity of the resulting substantially gas-free light reflux condensate utilized as said absorber oil.

6. The process as defined in claim 2 and having the further steps of establishing a cycle of said reflux condensate to and from a heating zone, utilizing an independently regulated amount of the heated reflux condensate from the heating zone as a reboiling medium in each of said stabilizing steps, and thereafter returning the independently regulated amounts of the reflux condensate to said cycle.

7. A process of separating a mixture of vaporous and gaseous products resulting from the cracking of hydrocarbon oil into a plurality of selected fractions which comprises, fractionating said mixture to form relatively light and relatively heavy reflux condensate and a stream of lighter fractionated vapors, consisting predominantly of normally gaseous fractions and materials boiling within the range of gasoline, further fractionating said stream to form a condensate, consisting essentially of heavy gasoline fractions, and a lighter vaporous stream, consisting essentially of light gasoline fractions and gases, substantially condensing the last named stream to form a light distillate containing substantial quantities of dissolved heavy gases such as propane, butane and the corresponding olefins, separating the resulting gas-containing distillate from the remaining uncondensed and undissolved gases, supplying said light distillate to a primary stabilizing step and therein substantially freeing the same of dissolved gases containing three and less carbon atoms to the molecule, while retaining therein substantially all of the four-carbon-atom gases, supplying the resulting partially stabilized light distillate to a secondary stabilizing step and therein reducing its vapor pressure to the desired degree by liberating therefrom regulated quantities of the dissolved four-carbon-atom gases, substantially condensing the gases evolved in the second stabilization step and recovering as the resulting distillate a normally gaseous material containing a high proportion of butanes and butenes, recovering the stabilized light distillate formed in the second stabilizing step as a portion of the final gasoline product of the process, recovering condensate formed in the second mentioned fractionating step as the remaining portion of said final gasoline product, substantially freeing light reflux condensate formed in the first mentioned fractionating step of undesired low-boiling components such as dissolved gases and thereafter contacting regulated quantities thereof with said uncondensed and undissolved gases, whereby to absorb from the latter substantially all of their four-carbon-atom fractions, substantially stripping the resulting enriched absorber oil of dissolved gases, cooling and returning resultant stripped absorber oil to the absorption step, and supplying gases liberated in said stripping step to the first mentioned stabilizing step.

PERCY MATHER.